United States Patent
Kobayashi et al.

(10) Patent No.: US 6,861,118 B2
(45) Date of Patent: Mar. 1, 2005

(54) MODULAR AREA RUG AND PROCESS OF MANUFACTURE

(75) Inventors: Seiin Kobayashi, Yamagata (JP); Thomas D. Nord, Yonezawa (JP)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/262,122

(22) Filed: Oct. 1, 2002

(65) Prior Publication Data

US 2004/0062899 A1 Apr. 1, 2004

(51) Int. Cl.[7] .............................. B32B 3/10; B32B 33/00
(52) U.S. Cl. ............................ 428/95; 428/44; 428/47
(58) Field of Search ......................... 428/95, 44, 47, 428/82

(56) References Cited

U.S. PATENT DOCUMENTS

| | | | |
|---|---|---|---|
| 3,862,874 A | 1/1975 | Hopper et al. | 161/36 |
| 4,286,003 A | 8/1981 | Higgins et al. | 428/95 |
| 4,497,853 A | 2/1985 | Tomarin | 428/17 |
| 4,731,275 A | * 3/1988 | Andersen | 428/95 |
| 4,798,644 A | 1/1989 | Scott et al. | 156/324 |
| 4,988,551 A | 1/1991 | Zegler | 428/40 |
| 5,179,749 A | 1/1993 | Magee | 8/150 |
| 5,567,497 A | 10/1996 | Zegler et al. | 428/95 |
| 5,683,780 A | 11/1997 | Rodger et al. | 428/95 |
| 6,060,145 A | 5/2000 | Smith et al. | 428/95 |
| 6,093,469 A | 7/2000 | Callas | 428/95 |
| 6,162,309 A | * 12/2000 | Brodeur et al. | 156/72 |
| 6,296,733 B1 | 10/2001 | Hudkins et al. | 156/245 |
| 6,344,254 B1 | 2/2002 | Smith et al. | 428/95 |
| 6,397,544 B1 | 6/2002 | Desai | 52/506.01 |
| 6,435,220 B1 | 8/2002 | Smith et al. | 139/383 |
| 6,510,872 B1 | 1/2003 | Smith et al. | 139/383 |
| 2002/0071930 A1 | * 6/2002 | Oakey et al. | 428/85 |

FOREIGN PATENT DOCUMENTS

| | | | | |
|---|---|---|---|---|
| FR | 2582210 A | * 11/1986 | | A47G/27/02 |
| WO | WO 9202163 A1 | * 2/1992 | | A47G/27/02 |
| WO | WO 02/025004 A3 | 9/2000 | | E04F/15/06 |

* cited by examiner

Primary Examiner—Cheryl A. Juska
(74) Attorney, Agent, or Firm—Terry T. Moyer; Charlotte C. Wilson

(57) ABSTRACT

There is provided a modular area rug having a plurality of individual floor covering elements positioned in an aesthetically pleasing tiled configuration. The modular area rug may include a plurality of similar repeating sub-units, each of which may comprise multiple floor covering elements. The modular area rug is free-standing, requiring no contact with a wall to maintain its monolithic nature. Further, the individual floor covering elements may be easily repositioned to satisfy user needs or whims. Each floor covering element has a textile upper surface and a skid-resistant backing of either a sheet material or a fabric-elastomer composite.

7 Claims, 4 Drawing Sheets

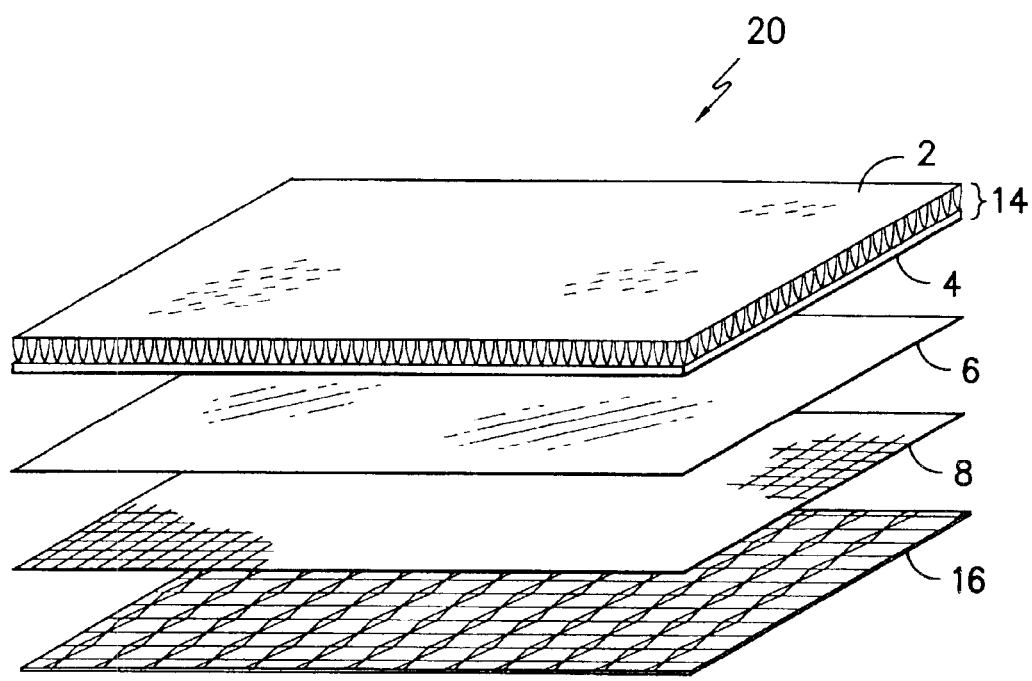
FIG. -1A-

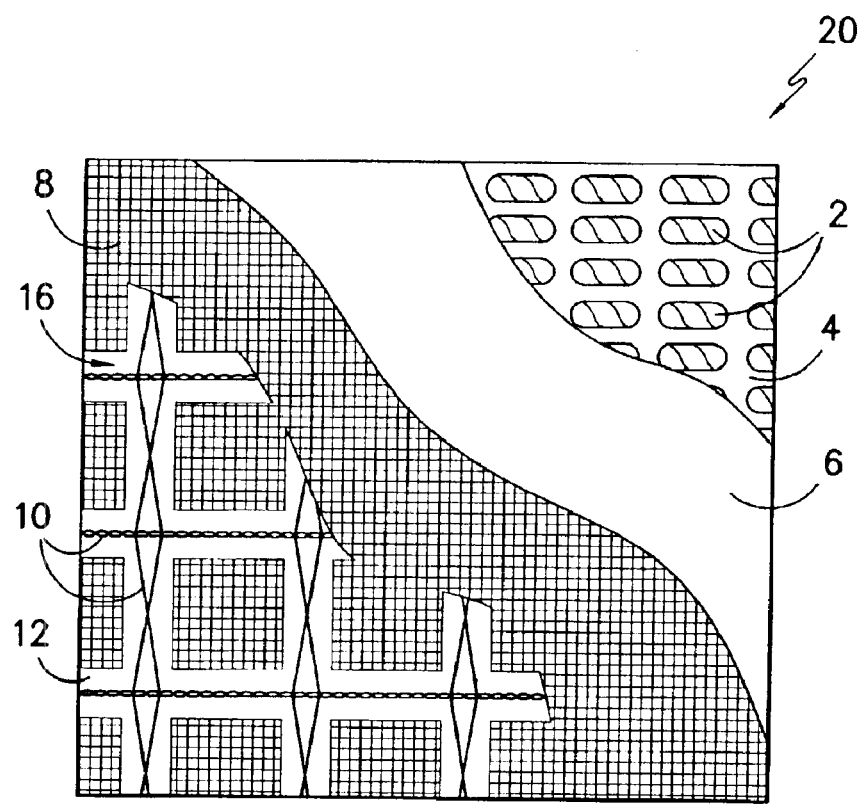
FIG. -1B-
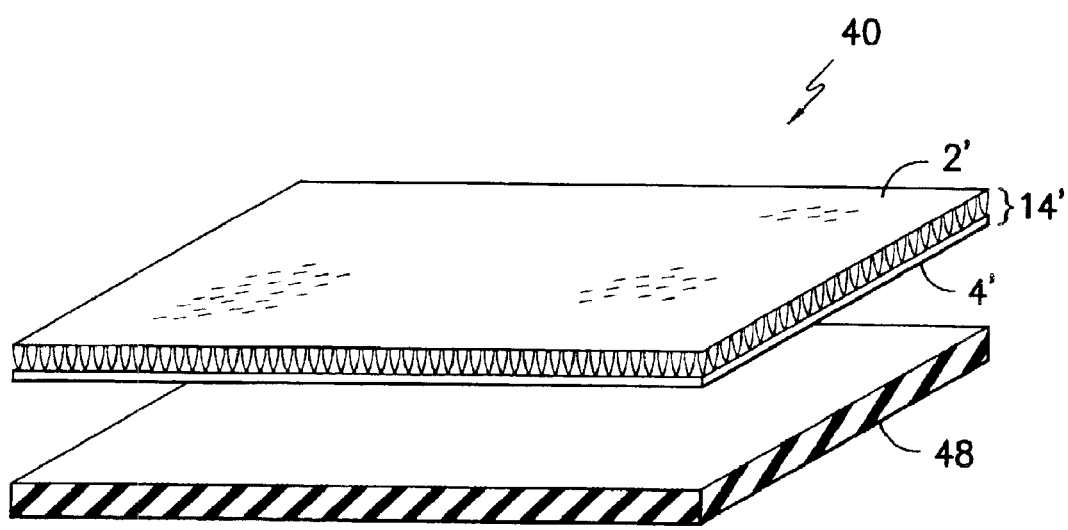
FIG. -2-

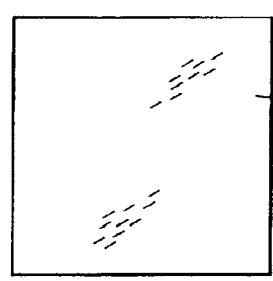
FIG. -3A-
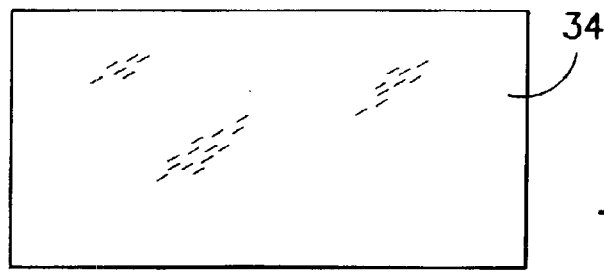
FIG. -3B-
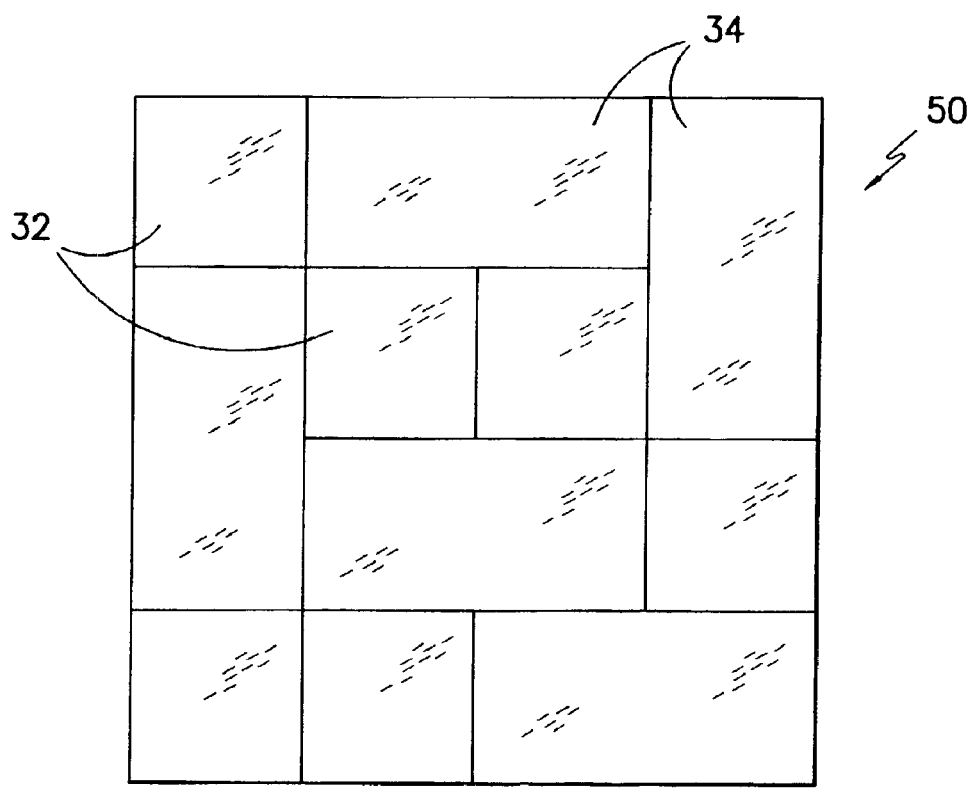
FIG. -4A-

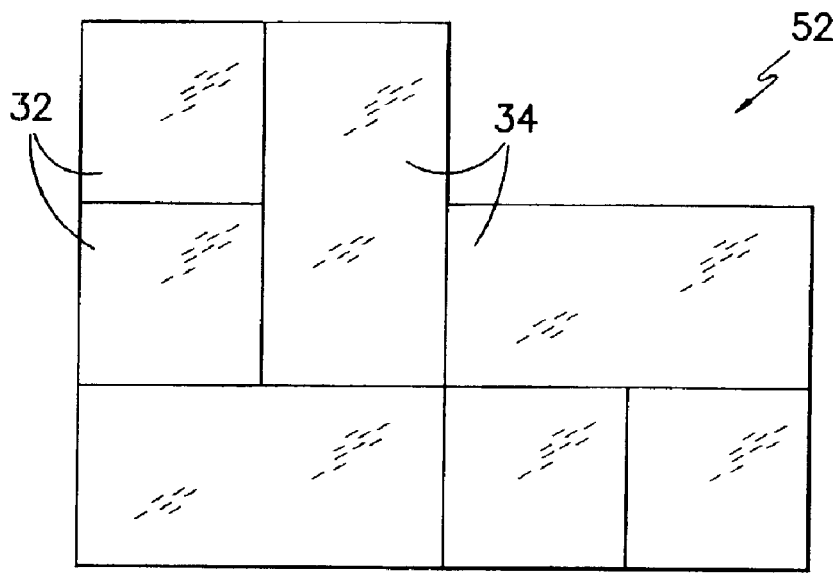
FIG. —4B—
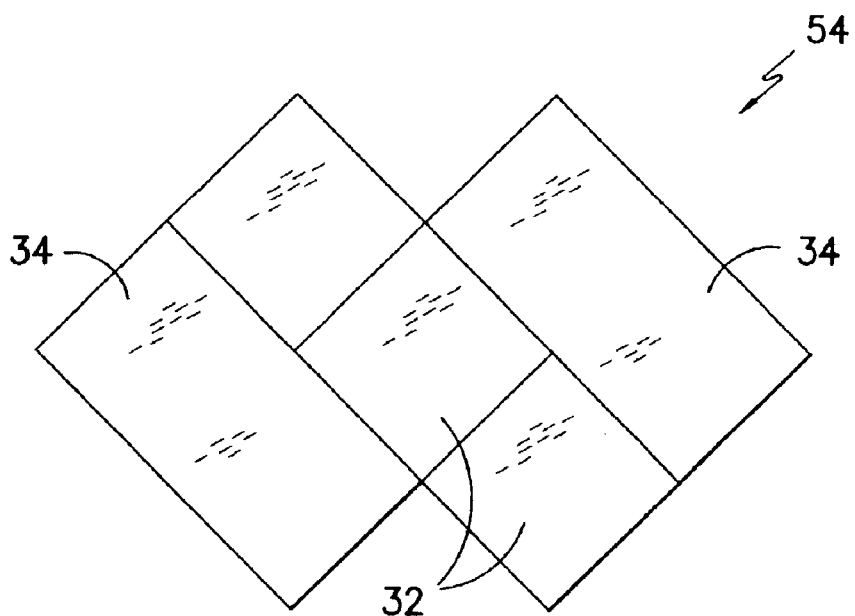
FIG. —4C—

MODULAR AREA RUG AND PROCESS OF MANUFACTURE

TECHNICAL FIELD

The present disclosure relates to a modular area rug having separate pieces that can be arranged into a variety of aesthetically pleasing tiled configurations at the discretion of the user. Each separate floor covering piece has a textile surface construction that is dyed in either a solid shade or a patterned design and a low-skid backing of either sheet material or a fabric-elastomer composite. The separable floor covering pieces together form a flooring unit that may resemble an area rug or other small carpet. The individual floor covering pieces, which are preferably square or rectangular, are installed randomly on the floor, allowing for greater variation in the exterior perimeter of the modular area rug.

BACKGROUND

Typically, area rugs are formed from one large piece of carpet that has been finished around the edges and that has a symmetrical shape (usually rectangular, circular, or oval). This construction poses several problems to users thereof. One problem with area rugs is their tendency to be ruined by spills, stains, burns, and the like. Second, such rugs are generally not launderable, because of their size. Finally, transporting and storing these rugs is difficult. The rugs, which must be rolled for handling, are heavy and awkward to carry.

Additionally, area rugs are limited to their initial size and shape. Should the user's interior floor plans change (for example, in moving to another dwelling), the user may be forced to place the area rug in another room or to purchase another area rug for the desired space. Likewise, if the rug owner purchases new furnishings for his home, he may be unhappy with the shape of his one-piece area rug.

The present modular area rug addresses and overcomes these problems. All of the problems discussed above (transporting and storage, staining and soiling, laundering, and fixed dimensions) are solved by replacing the one-piece construction with modular components. Unlike carpet tiles, which must be installed across an entire flooring surface, the component pieces of the present modular area rug have a backing that allows installation in any desired area and configuration.

SUMMARY

The modular area rug described herein features a plurality of individual floor covering elements, each having a textile upper surface and a skid-resistant backing. Together, the individual elements form a modular area rug. The individual elements are capable of being fashioned in a variety of configurations to meet user needs or whims. The skid-resistant backing of the floor covering elements may be made from a fabric-elastomer composite or from a sheet material (such as rubber).

BRIEF DESCRIPTION OF THE DRAWING

FIG. 1A is an exploded view of one preferred embodiment of one floor covering element of the present modular area rug;

FIG. 1B is a plan view of the rear side of the floor covering element of FIG. 1A;

FIG. 2 is an exploded view of a second preferred embodiment of one floor covering element of the present modular area rug;

FIG. 3A is a plan view of a square floor covering element of the present modular area rug;

FIG. 3B is a plan view of a rectangular floor covering element of the present modular area rug;

FIG. 4A is a plan view of one configuration of the floor covering elements of FIGS. 3A and 3B;

FIG. 4B is a plan view of another configuration of the floor covering elements of FIGS. 3A and 3B; and FIG. 4C is a plan view of yet another configuration of the floor covering elements of FIGS. 3A and 3B.

DETAILED DESCRIPTION

In order to describe the invention, it is necessary to define the terms that will be used herein. First, the term "floor covering element" is intended to describe one of a plurality of components useful in the creation of a modular area rug. A floor covering element is characterized by a textile upper surface that is attached to a backing formed from either a sheet material (such as rubber) or a fabric-elastomer composite.

The term "modular area rug" is intended to describe a plurality of individual floor covering elements that are arranged in an aesthetically pleasing tiled configuration. A modular area rug may include a plurality of similar repeating sub-units, each of which may comprise multiple floor covering elements. The shape of the modular area rug may be symmetrical or asymmetrical. The modular area rug is designed to be free-standing, unlike conventional carpet tiles, requiring no contact with a wall in order to maintain its monolithic nature.

The term "tiled configuration" refers to an arrangement of floor covering elements in which the floor covering elements are abutted next to one another, without having the floor covering elements overlap. In a tiled configuration, there is substantially no space between the perimeters of adjacent floor covering elements.

The term "simple sheet backing" refers to a single sheet of material that is secured to the back side of the textile upper surface of the floor covering element. Such a sheet material may preferably be comprised of rubber, although a number of other materials may be used as will be discussed herein.

The term "fabric-elastomer composite" refers to a backing that comprises both a fabric layer and an elastomeric component. In particular, the fabric layer is only partially covered by the elastomeric material, which is preferably applied in a grid-like configuration. This construction allows the backing to remain soft (that is, in those areas where the fabric layer contacts the floor) and to provide skid resistance because of those areas where the elastomeric material contacts the floor.

In one preferred embodiment shown in FIGS. 1A and 1B, floor covering element 20 has a textile upper surface 14 having yarns 2 and a primary substrate 4 in which yarns 2 are secured; an adhesive layer 6 positioned between primary backing or substrate 4 and secondary backing or substrate 8; a secondary backing or substrate 8; and an open mesh layer 16 whose coating 12 is fused into the flooring construction.

In a second embodiment shown in FIG. 2, floor covering element 40 has a textile upper surface 14' having yarns 2' and a primary substrate 4' in which yarns 2' are secured and a simple sheet backing layer 48 made from rubber or other similar sheet material.

Yarns 2, 2' are comprised of natural and/or synthetic fibers. By way of example, yarns 2, 2' may be nylon, polyester, acrylic, polypropylene, cotton, wool, or any combination thereof. Nylon is the preferred fiber type because of its durability, crush resistance, and colorfastness when dyed. Alternatively, solution dyed synthetic yarns may also be used. Yarns 2, 2' may be twisted and heat-set, twisted without heat setting, or untwisted. Further, yarns 2, 2' may be of the frieze or non-frieze type. Yarns 2, 2' of textile upper surface 14, 14' are preferably attached to and/or through the primary backing or substrate 4, 4', as will be described.

Primary substrate 4, 4', in which yarns 2, 2' are preferably placed, is comprised of any woven or nonwoven material, such as, but not limited to, nylon, polypropylene, polyester, cotton, wool, acrylic, glass, or combinations thereof. One preferred primary substrate is a polyester nonwoven substrate that is coated with nylon and, more preferably, that is dyed a dark color to mask the appearance of the substrate and to emphasize the color of the yarns. Speaking of this preferred substrate, the nylon component of substrate 4, 4' tends to accept the dye used for yarns 2, 2', further masking substrate 4, 4' from users. One important aspect of using a nylon-coated polyester nonwoven substrate is its dimensional stability, particularly during dye processing, during the backing formation process, and during laundering. Alternately, a woven polypropylene substrate with either a nonwoven nylon cap, a nonwoven polyester cap, or a nonwoven polypropylene cap may also be used.

Texile upper surface 14, 14' may comprise a tufted cut-pile surface, a tufted loop-pile surface, a tufted multilevel pile, a tufted combination of loop and cut pile, a needle-punched surface, a bonded pile surface, a woven fabric, a knit fabric, a nonwoven fabric, or a combination thereof. Preferably, textile upper surface 14, 14' is a tufted cut-pile surface, because of its appearance, softness, and dust control attributes. Textile upper surface 14, 14' may further be patterned by methods such as, but not limited to, dye injection, graphic tufting, screen printing, pad dyeing, flocking, or combinations thereof. Dye injection printing is preferred because of the ability to create intricate and customized designs. It has been found that dyeing the individual floor covering elements in either a solid shade or in a random pattern helps to hide seams between the elements.

Adhesive layer 6 (found in floor covering element 20) serves to secure yarns 2 in primary substrates. Adhesive layer 6 is-typically a solid material that softens when subjected to heat and pressure. This softening creates cohesion between primary substrate 4 and secondary backing substrate 8. Adhesive layer 6 may be comprised of any number of materials, including, but not limited to, natural or synthetic rubbers (including polyisoprene rubbers, styrene-butadiene rubbers, acrylonitrile-butadiene rubbers, ethylene propylene rubbers), urethanes, polypropylene, polyethylene, nylon, polyester, acrylonitrile-butadiene-styrene, polyvinyl chloride, thermoplastic elastomers, thermoset plastics, low-melt thin films, or any combinations thereof. The use of thermoplastic elastomer is preferred because of its adhesion properties and its ease of use in manufacturing.

Secondary backing or substrate 8 (also found in floor covering element 20) is useful in providing a soft backing for floor covering element 20 and in providing dimensional stability to floor covering element 20. Secondary backing or substrate 8 also decreases the likelihood of adhesive layer 6 cracking or breaking with use of floor covering element 20. In addition, secondary backing or substrate 8 provides a uniform appearance on the reverse side of floor covering element 20. Cotton, wool, polyester, polypropylene, nylon, acrylic, or any combinations thereof may be used to create secondary backing substrate 8, which may be a woven, nonwoven, or knit material. The use of a cotton or polyester woven material is preferred for softness.

The final component of floor covering element 20 is a mesh fabric 10 that has a coating 12 surrounding the mesh. Coated mesh fabric 16 adds dimensional stability to floor covering element 20 and prevents floor covering element 20 from sliding during use. Coated mesh fabric 16 may comprise any woven, nonwoven, or knit material (shown as fabric 10 in the drawings), having a substantially open configuration. Woven fabrics are preferred for the uniformity of the mesh. The openings in mesh fabric 10 should preferably be from about 0.125 inches to about 1.5 inches, and more preferably be about 0.5 inches. Fabric 10 itself may be comprised of cotton, polyester, polypropylene, nylon, acrylic, or any combination thereof, although cotton or polyester is more preferred. When using cotton or polyester, it may be desirable to pre-shrink the fabric before coating.

Fabric 10 is coated with, by way of example, natural or synthetic rubbers (including polyisoprene rubbers, styrene-butadiene rubbers, acrylonitrile-butadiene rubbers, ethylene propylene rubbers), urethanes, polypropylene, polyethylene, nylon, polyester, acrylonitrile-butadiene-styrene, polyvinyl chloride, thermoplastic elastomers, thermoset plastics, or any combinations thereof. The coating 12 is shown in FIGS. 1A and 1B. The preferred mesh fabric 16 is a woven fabric 10 with a latex coating 12, in which the fabric component 10 is made from cotton or polyester. It has been found that production of floor covering element 20 is most successful when the melting points of coating 12 and adhesive layer 6 are comparable.

Floor covering element 40 includes a simple sheet backing layer 48 in place of the fabric-elastomer composite used in floor covering element 20. Preferably, backing layer 48 is adhered to textile upper surface 14' during vulcanization, but backing layer 48 may also be adhered by molding, ironing, hot calendering, or the like. Backing layer 48 may comprise any number of sheet materials, including, but not limited to, any one or a combination of rubber materials that will be discussed herein, urethane, polypropylene, polyethylene, nylon, polyester, acrylonitrile-butadiene-styrene, polyvinyl chloride (PVC), other thermoplastic elastomers, thermoset plastics, or any combination thereof. Suitable rubber materials include natural or synthetic rubbers including polyisoprene rubbers, styrene-butadiene rubbers, acrylonitrile-butadiene rubbers, ethylene propylene rubbers. One preferred rubber material is acrylonitrile-butadiene rubbers.

Floor covering elements 20, 40 are produced by placing the component pieces on top of one another as in a continuous vulcanization press or shuttle vulcanization press. The process may be run continuously or in batch mode.

In the production of floor covering element 20, the layers of element 20 are positioned as follows: coated mesh fabric 16, secondary backing substrate 8, adhesive layer 6, and textile upper surface 14, which comprises primary substrate 4 and yarns 2. It should be noted that coated mesh fabric 16 should be positioned toward the heating platen of the vulcanization chamber (that is, if the heating platen is at the top of the chamber, then the order described above should be reversed).

In the production of floor covering element 40, the layers of element 40 are positioned as follows: sheet backing layer 48 and textile upper surface 14', with backing layer 48 being positioned toward the heating platen. One particular advantage experienced in the production of floor covering elements 40 is that continuous rolls of textile upper surface 14' and sheet backing layer 48 may be overlapped in the vulcanization chamber. The resultant composite may then be cut, using conventional cutting means, into individual floor covering elements 40, having any desired shape.

The pre-assembly—of either element 20 or element 40—is then subjected to heat and pressure, as would be found in a vulcanization chamber. In the creation of element 20, the heat and pressure of the vulcanization environment cause adhesive layer 6 and coating 12 of mesh fabric 16 to melt and fuse the component layers together. In the creation of element 40, the heat and pressure of the vulcanization environment cause backing layer 48 (preferably, rubber) to adhere to textile upper surface 14' and to cure. Temperatures in the range of about 180° C. to about 220° C. are preferred, while temperatures in the range of about 195° C. to about 200° C. are more preferred. Pressures ranging from about 15 pounds per square inch (gauge) (p.s.i.g.) to about 50 p.s.i.g. are preferred, while a pressure of about 30 p.s.i.g. is more preferred. These temperatures and pressures are suitable for forming floor covering elements 20, 40, regardless of the type of backing material incorporated therein.

Floor covering element 20 preferably has a backing that is soft, skid-resistant, and durable. Such a backing prevents damage to flooring surfaces on which floor covering element 20 is placed and prevents floor covering element 20 from sliding during use. Some conventional area rugs include a backing made from latex material, which can abrade the flooring surface onto which it is placed. Other conventional area rugs have a felt backing that can cause the rug to slide during use. The backing of floor covering element 20 overcomes these problems.

FIG. 3A shows one shape useful in creating the present modular area rug. FIG. 3A shows floor covering element 32 cut in the shape of a square. One particularly preferred dimension is a square having a side length of about 18 inches. It is worth noting that element 32 may have the construction of floor covering element 20 (having a fabric-elastomer backing) or floor covering element 40 (having a single sheet backing layer).

FIG. 3B shows a variation of the shape of the floor covering element 32, in which floor covering element 34 has the shape of a rectangle. Like element 32, element 34 may have the construction of floor covering element 20 (having a fabric-elastomer backing) or floor covering element 40 (having a single sheet backing layer). One particularly preferred size for floor covering element 34 is about 18 inches by about 36 inches. Other multiples of the size of element 32 may also be used. The use of straight-edged, right-angled polygons is preferred because of the ease with which the square and rectangular elements 32, 34 may be packed and stored. For instance, square and rectangular elements 32, 34 having similar dimensions may easily be packaged in the same rectangular box for shipping and storage.

Although floor covering elements 32, 34 are shown as straight-sided, right-angled polygons, other shapes having straight and/or curved sides are also contemplated. For example, floor covering elements 20, 40 could be in the shape of triangles, hexagons, trapezoids, rhombuses, and the like.

FIG. 4A shows one contemplated arrangement of elements 32, 34 to create a modular area rug 50. In this illustration, modular area rug 50 has a rectangular perimeter, as is similar to other one-piece area rugs. Elements 32, 34 are positioned in such a manner as to mask the seams between the individual components 32, 34. FIG. 4B shows a second contemplated arrangement of components 32, 34 to create a flooring unit 52. The L-shaped perimeter of flooring unit 52 may be preferred as a complement to certain furniture configurations. FIG. 4C shows yet another contemplated arrangement of components 32, 34 to create a flooring unit 54. The configurations of flooring units 50, 52, 54 are intended to show the versatility of the present flooring components 30, 32 to create a variety of flooring units as may be desired by the customer. In addition, the customer can easily reconfigure components 30, 32 to create a new flooring unit as their tastes or surroundings may dictate. Such flexibility is not possible with typical one-piece area rugs.

Floor covering elements 32, 34 may be attached to one another by conventional means (such as tape along the seams of the reverse side), but such attachment is not required. Further, floor covering elements 32, 34 may also be operably affixed to the floor by means of conventional releasable carpet tile adhesive, other similar permanently tacky adhesives, double-sided tape, or the like.

Flooring covering elements 20, 40 may optionally be treated with an antimicrobial agent to prevent the odor and deterioration of the product that is caused by bacterial or microbial growth. The treatment may be applied to the raw materials before creating the product or may be applied topically with each washing. Inherently antimicrobial raw materials (such as zinc based compounds) may also be used in the product. Examples of suitable antimicrobial agents include AEM 5700 antimicrobial agent from Dow Chemical and Alphasan® antimicrobial agent from Milliken Chemical, a division of Milliken & Company. One method of incorporating an antimicrobial agent into rubber is described in U.S. Pat. No. 6,332,293 to Rockwell, the disclosure of which is hereby incorporated by reference.

What is claimed is:

1. A modular area rug consisting essentially of a plurality of individual floor covering elements positioned in a tiled configuration wherein perimeter edges of a portion of the floor covering elements define outer boundary edges of said area rug, each floor covering element having a textile upper surface and a fabric-elastomer composite backing affixed to said textile upper surface, said textile upper surface having a construction selected from group consisting of a tufted cut-pile, a tufted loop-pile, a tufted multi-level pile, a tufted combination of loop and cut pile, a needle-punched surface, a bonded pile, a woven fabric, a knit fabric, a nonwoven fabric, and combinations thereof, and wherein said fabric-elastomer composite backing comprises a fabric substrate layer having a first side facing towards the textile upper surface and a second side facing away from the textile upper surface, and wherein said fabric-elastomer composite backing further comprises a coated mesh fabric disposed in contacting bonded relation to said fabric substrate layer across said second side, wherein said coated mesh fabric comprises a meltable coating disposed in coated relation to a fabric and wherein said coated mesh fabric is bonded directly to said fabric substrate layer by said coating in a discontinuous melt fused pattern across said second side.

2. The modular area rug of claim 1, wherein said textile upper surface has a tufted pile construction.

3. The modular area rug of claim 2, wherein said tufted pile construction includes yarns that are tufted through a nonwoven backing substrate.

4. The modular area rug of claim 1, wherein said plurality of floor covering elements includes floor covering elements that are square and rectangular.

5. The modular area rug of claim 4, wherein said modular area rug consists essentially of a plurality of repeating sub-units, each of said sub-units being formed of a plurality of said floor covering elements.

6. The modular area rug of claim 1, wherein said fabric-elastomer composite backing comprises a woven fabric substrate layer and wherein said meltable coating is an elastomer coating adhered to said woven fabric.

7. The modular area rug of claim 6, wherein an adhesive layer is positioned between said textile upper surface and said fabric-elastomer composite backing in order to adhere said textile upper surface to said fabric-elastomer composite backing.

* * * * *